United States Patent
Paithane et al.

(10) Patent No.: US 9,916,440 B1
(45) Date of Patent: *Mar. 13, 2018

(54) DETECTION EFFICACY OF VIRTUAL MACHINE-BASED ANALYSIS WITH APPLICATION SPECIFIC EVENTS

(71) Applicant: FireEye, Inc., Milpitas, CA (US)

(72) Inventors: Sushant Paithane, Sunnyvale, CA (US); Sai Vashisht, Union City, CA (US)

(73) Assignee: FireEye, Inc., Milpitas, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 15/043,392

(22) Filed: Feb. 12, 2016

Related U.S. Application Data

(63) Continuation of application No. 14/173,765, filed on Feb. 5, 2014, now Pat. No. 9,262,635.

(51) Int. Cl.
| | |
|---|---|
| *H02G 1/08* | (2006.01) |
| *G06F 21/53* | (2013.01) |
| *G06F 21/56* | (2013.01) |
| *G06F 9/455* | (2018.01) |

(52) U.S. Cl.
CPC .......... *G06F 21/53* (2013.01); *G06F 9/45558* (2013.01); *G06F 21/566* (2013.01); *G06F 2009/45591* (2013.01); *G06F 2221/033* (2013.01)

(58) Field of Classification Search
CPC ....................................................... G06F 21/53
See application file for complete search history.

(56) References Cited

U.S. PATENT DOCUMENTS

| | | | |
|---|---|---|---|
| 4,292,580 | A | 9/1981 | Ott et al. |
| 5,175,732 | A | 12/1992 | Hendel et al. |
| 5,440,723 | A | 8/1995 | Arnold et al. |

(Continued)

FOREIGN PATENT DOCUMENTS

| | | |
|---|---|---|
| GB | 2439806 A | 1/2008 |
| GB | 2490431 A | 10/2012 |
| WO | 02/23805 A2 | 3/2002 |
| WO | 02/006928 A2 | 8/2003 |
| WO | 2007117636 A2 | 10/2007 |

(Continued)

OTHER PUBLICATIONS

Marchette, David J., "Computer Intrusion Detection and Network Monitoring: A Statistical Viewpoint", ("Marchette"), (2001).

(Continued)

*Primary Examiner* — Morshed Mehedi
(74) *Attorney, Agent, or Firm* — Rutan & Tucker, LLP

(57) ABSTRACT

A computerized system and method is described for classifying objects as malicious by processing the objects in a virtual environment and monitoring behaviors during processing by one or more monitors, where the monitoring is conducted in an electronic device that is different than the electronic device within which an analysis of attributes of the objects is conducted beforehand. The monitors may monitor and record selected sets of process operations and capture associated process parameters, which describe the context in which the process operations were performed. By recording the context of process operations, the system and method described herein improves the intelligence of classifications and consequently reduces the likelihood of incorrectly identifying objects as malware or vice versa.

32 Claims, 9 Drawing Sheets

(56) References Cited

U.S. PATENT DOCUMENTS

| | | |
|---|---|---|
| 5,490,249 A | 2/1996 | Miller |
| 5,657,473 A | 8/1997 | Killean et al. |
| 5,842,002 A | 11/1998 | Schnurer et al. |
| 5,978,917 A | 11/1999 | Chi |
| 6,088,803 A | 7/2000 | Tso et al. |
| 6,094,677 A | 7/2000 | Capek et al. |
| 6,108,799 A | 8/2000 | Boulay et al. |
| 6,118,382 A | 9/2000 | Hibbs et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,417,774 B1 | 7/2002 | Hibbs et al. |
| 6,424,627 B1 | 7/2002 | Sørhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,700,497 B2 | 3/2004 | Hibbs et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 6,995,665 B2 | 2/2006 | Appelt et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,316,439 B2 * | 11/2012 | Fang .................. G06F 21/554 709/227 |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |

(56) References Cited

U.S. PATENT DOCUMENTS

| | | |
|---|---|---|
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,282 B1 | 11/2014 | Aziz et al. |
| 8,898,788 B1 | 11/2014 | Aziz et al. |
| 8,935,779 B2 | 1/2015 | Manni et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent |
| 9,262,635 B2 | 2/2016 | Paithane et al. |
| 9,282,109 B1 | 3/2016 | Aziz et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhaf et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |

(56) References Cited

U.S. PATENT DOCUMENTS

| | | |
|---|---|---|
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0016953 A1* | 1/2007 | Morris .............. G06F 21/577 726/24 |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0031353 A1 | 2/2010 | Thomas et al. |
| 2010/0037314 A1 | 2/2010 | Perdisci et al. |
| 2010/0054278 A1 | 3/2010 | Stolfo et al. |
| 2010/0115621 A1 | 5/2010 | Staniford et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0281541 A1 | 11/2010 | Stolfo et al. |
| 2010/0281542 A1 | 11/2010 | Stolfo et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0047620 A1* | 2/2011 | Mahaffey .............. G06F 21/564 726/23 |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |

(56) References Cited

U.S. PATENT DOCUMENTS

| | | |
|---|---|---|
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260304 A1* | 10/2012 | Morris ............... G06F 21/56 726/1 |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0130161 A1* | 5/2014 | Golovanov ............ G06F 21/564 726/23 |
| 2014/0137180 A1 | 5/2014 | Lukacs et al. |
| 2014/0157407 A1* | 6/2014 | Krishnan ............... G06F 21/53 726/22 |
| 2014/0169762 A1 | 6/2014 | Ryu |
| 2014/0179360 A1 | 6/2014 | Jackson et al. |
| 2014/0328204 A1 | 11/2014 | Klotsche et al. |
| 2014/0337836 A1 | 11/2014 | Ismael |
| 2014/0351935 A1 | 11/2014 | Shao et al. |
| 2015/0096018 A1* | 4/2015 | Mircescu ............... G06F 21/56 726/23 |
| 2015/0096025 A1 | 4/2015 | Ismael |

FOREIGN PATENT DOCUMENTS

| | | |
|---|---|---|
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2013/067505 A1 | 5/2013 |

OTHER PUBLICATIONS

Margolis, P.E., "Random House Webster's 'Computer & Internet Dictionary 3rd Edition'", ISBN 0375703519, (Dec. 1998).

Moore, D., et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt, "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Newsome, J., et al., "Polygraph: Automatically Generating Signatures for Polymorphic Worms", In Proceedings of the IEEE Symposium on Security and Privacy, (May 2005).

Nojiri, D., et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.—N-Version Antivirus in the Network Cloud, 17th USENIX Security Symposium USENIX Security '08 Jul. 28-Aug. 1, 2008 San Jose, CA.

Reiner Sailer, Enriquillo Valdez, Trent Jaeger, Roonald Perez, Leendert van Doorn, John Linwood Griffin, Stefan Berger., sHype: Secure Hypervisor Approach to Trusted Virtualized Systems (Feb. 2, 2005) ("Sailer").

Silicon Defense, "Worm Containment in the Internal Network", (Mar. 2003), pp. 1-25.

Singh, S., et al., "Automated Worm Fingerprinting", Proceedings of the ACM/USENIX Symposium on Operating System Design and Implementation, San Francisco, California, (Dec. 2004).

Spitzner, Lance, "Honeypots: Tracking Hackers", ("Spizner"), (Sep. 17, 2002).

The Sniffers's Guide to Raw Traffic available at: yuba.stanford. edu/.about.casado/pcap/section1.html, (Jan. 6, 2014).

Thomas H. Ptacek, and Timothy N. Newsham, "Insertion, Evasion, and Denial of Service: Eluding Network Intrusion Detection", Secure Networks, ("Ptacek"), (Jan. 1998).

U.S. Appl. No. 14/173,765, filed Feb. 5, 2014 Non-Final Office Action dated Apr. 16, 2015.

U.S. Pat. No. 8,171,553 filed Apr. 20, 2006, Inter Parties Review Decision dated Jul. 10, 2015.

U.S. Pat. No. 8,291,499 filed Mar. 16, 2012, Inter Parties Review Decision dated Jul. 10, 2015.

Venezia, Paul, "NetDetector Captures Intrusions", InfoWorld Issue 27, ("Venezia"), (Jul. 14, 2003).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

"Network Security: NetDetector—Network Intrusion Forensic System (NIFS) Whitepaper", ("NetDetector Whitepaper"), (2003).

"Packet", Microsoft Computer Dictionary, Microsoft Press, (Mar. 2002), 1 page.

"When Virtual is Better Than Real", IEEEXplore Digital Library, available at, http://ieeexplore.ieee.org/xpl/articleDetails.jsp?reload=true&arnumbe- r=990073, (Dec. 7, 2013).

(56) References Cited

OTHER PUBLICATIONS

Abdullah, et al., Visualizing Network Data for Intrusion Detection, 2005 IEEE Workshop on Information Assurance and Security, pp. 100-108.
Adetoye, Adedayo, et al., "Network Intrusion Detection & Response System", ("Adetoye"), (Sep. 2003).
Adobe Systems Incorporated, "PDF 32000-1:2008, Document management—Portable document format—Part1:PDF 1.7", First Edition, Jul. 1, 2008, 756 pages.
AltaVista Advanced Search Results. "attack vector identifier". Http://www.altavista.com/web/results?ltag=ody&pg=aq&aqmode=aqa=Event+Orch- estrator . . . , (Accessed on Sep. 15, 2009).
AltaVista Advanced Search Results. "Event Orchestrator". Http://www.altavista.com/web/results?ltag=ody&pg=aq&aqmode=aqa=Event+Orch- esrator . . . , (Accessed on Sep. 3, 2009).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.
Bayer, et al., "Dynamic Analysis of Malicious Code", J Comput Virol, Springer-Verlag, France., (2006), pp. 67-77.
Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003).
Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen").
Cisco "Intrusion Prevention for the Cisco ASA 5500-x Series" Data Sheet (2012).
Cisco, Configuring the Catalyst Switched Port Analyzer (SPAN) ("Cisco"), (1992-2003).
Clark, John, Sylvian Leblanc,and Scott Knight. "Risks associated with usb hardware trojan devices used by insiders." Systems Conference (SysCon), 2011 IEEE International. IEEE, 2011.
Cohen, M.I., "PyFlag—An advanced network forensic framework", Digital investigation 5, Elsevier, (2008), pp. S112-S120.
Costa, M., et al., "Vigilante: End-to-End Containment of Internet Worms", SOSP '05, Association for Computing Machinery, Inc., Brighton U.K., (Oct. 23-26, 2005).
Crandall, J.R., et al., "Minos:Control Data Attack Prevention Orthogonal to Memory Model", 37th International Symposium on Microarchitecture, Portland, Oregon, (Dec. 2004).
Deutsch, P., "Zlib compressed data format specification version 3.3" RFC 1950, (1996).
Distler, "Malware Analysis: An Introduction", SANS Institute InfoSec Reading Room, SANS Institute, (2007).
Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
Excerpt regarding First Printing Date for Merike Kaeo, Designing Network Security ("Kaeo"), (2005).
Filiol, Eric, et al., "Combinatorial Optimisation of Worm Propagation on an Unknown Network", International Journal of Computer Science 2.2 (2007).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:https://web.archive.org/web/20121022220617/http://www.informationweek- .com/microsofts-honeymonkeys-show-patching-wi/167600716 [retrieved on Sep. 29, 2014].
Heng Yin et al, Panorama: Capturing System-Wide Information Flow for Malware Detection and Analysis, Research Showcase @ CMU, Carnegie Mellon University, 2007.
Hjelmvik, Erik, "Passive Network Security Analysis with NetworkMiner", (In)Secure, Issue 18, (Oct. 2008), pp. 1-100.
Idika et al., A-Survey-of-Malware-Detection-Techniques, Feb. 2, 2007, Department of Computer Science, Purdue University.
IEEE Xplore Digital Library Sear Results for "detection of unknown computer worms". Http//ieeexplore.ieee.org/searchresult.jsp?SortField=Score&SortOrder=desc- &ResultC . . . , (Accessed on Aug. 28, 2009).
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Menke, "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King") (2003).
Krasnyansky, Max, et al., Universal TUN/TAP driver, available at https://www.kernel.org/doc/Documentation/networking/tuntap.txt (2002) ("Krasnyansky").
Kreibich, C., et al., "Honeycomb-Creating Intrusion Detection Signatures Using Honeypots", 2nd Workshop on Hot Topics in Networks (HotNets-11), Boston, USA, (2003).
Kristoff, J., "Botnets, Detection and Mitigation: DNS-Based Techniques", NU Security Day, (2005), 23 pages.
Leading Colleges Select FireEye to Stop Malware-Related Data Breaches, FireEye Inc., 2009.
Li et al., A VMM-Based System Call Interposition Framework for Program Monitoring, Dec. 2010, IEEE 16th International Conference on Parallel and Distributed Systems, pp. 706-711.
Liljenstam, Michael, et al., "Simulating Realistic Network Traffic for Worm Warning System Design and Testing", Institute for Security Technology studies, Dartmouth College ("Liljenstam"), (Oct. 27, 2003).
Lindorfer, Martina, Clemens Kolbitsch, and Paolo Milani Comparetti. "Detecting environment-sensitive malware." Recent Advances in Intrusion Detection. Springer Berlin Heidelberg, 2011.
Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12- -final107.pdf [retrieved on Dec. 15, 2014].

* cited by examiner

| Process | Process Operations | Process Parameters | | | | | | Application Specific Behaviors (ASBs) |
|---|---|---|---|---|---|---|---|---|
| | | Parameter 1 | Parameter 2 | Parameter 3 | Parameter 4 | Parameter 5 | Parameter 6 | |
| Process 203A | Process Operation 301A | x | x | | | | | ASB 1 |
| | Process Operation 301B | x | | | | x | | ASB 2 |
| Process 203C | Process Operation 301C | | | x | | | | ASB 3 |
| | Process Operation 301D | x | | | | x | x | ASB 4 |
| | Process Operation 301E | | | | x | | | ASB 5 |
| Process 203D | Process Operation 301F | x | x | x | | | | ASB 6 |
| | Process Operation 301G | x | | x | | x | | ASB 7 |

FIG. 4A

| PROCESS ID | DETECTED PROCESS OPERATION | RECORD PROCESS PARAMETERS | APPLICATION SPECIFIC BEHAVIOR (ASB) |
|---|---|---|---|
| PROCESS 203A | PROCESS OPERATION 301A | PROCESS PARAMETER VALUES 1 AND 2 | ASB 1 |
| PROCESS 203B | PROCESS OPERATION 301B | PROCESS PARAMETER VALUES 1 AND 5 | ASB 2 |
| PROCESS 203C | PROCESS OPERATION 301C | PROCESS PARAMETER VALUE 3 | ASB 3 |
| PROCESS 203C | PROCESS OPERATION 301D | PROCESS PARAMETER VALUES 1, 5, AND 6 | ASB 4 |
| PROCESS 203D | PROCESS OPERATION 301E | PROCESS PARAMETER VALUE 4 | ASB 5 |
| PROCESS 203D | PROCESS OPERATION 301F | PROCESS PARAMETER VALUES 1, 2, AND 3 | ASB 6 |
| PROCESS 203D | PROCESS OPERATION 301G | PROCESS PARAMETER VALUES 1, 3, AND 5 | ASB 7 |

FIG. 4B

DETECTION EFFICACY OF VIRTUAL MACHINE-BASED ANALYSIS WITH APPLICATION SPECIFIC EVENTS

CROSS-REFERENCE OF RELATED APPLICATIONS

This application is a continuation of U.S. patent application Ser. No. 14/173,765 filed on Feb. 5, 2014, now U.S. Pat. No. 9,262,635. The entire contents of U.S. patent application Ser. No. 14/173,765 are incorporated by reference herein.

1. FIELD

Embodiments of the disclosure relate to the field of network and cyber security. More specifically, one embodiment of the disclosure relates to a system and method of detecting malicious activity.

2. GENERAL BACKGROUND

Over the last decade, malicious software (malware) has become a pervasive problem for Internet users. In some situations, malware is a program or file that is embedded within downloadable content and designed to adversely influence or attack normal operations of a computer. Examples of different types of malware may include bots, computer viruses, worms, Trojan horses, spyware, adware, or any other programming that operates within an electronic device (e.g., computer, tablet, smartphone, server, router, wearable technology, or other types of electronics with data processing capability) without permission by the user or an administrator.

For instance, content may be embedded within objects associated with a web page hosted by a malicious web site. By downloading this content, malware causing another web page to be requested from a malicious web site may be unknowingly installed on the computer. Similarly, malware may also be installed on a computer upon receipt or opening of an electronic mail (email) message. For example, an email message may contain an attachment, such as a Portable Document Format (PDF) document, with embedded executable malware. Also, malware may exist in files infected through any of a variety of attack vectors, which are uploaded from the infected computer onto a networked storage device such as a file share.

Over the past few years, various types of security appliances have been deployed at different segments of a network. These security appliances use virtual machines to uncover the presence of malware embedded within ingress content propagating over these different segments. In particular, virtual machines (VMs) are equipped to monitor operations performed by ingress content during processing. The security appliances analyze the observed operations in an attempt to identify unexpected or anomalous operations that may indicate exploits. However, this operation monitoring is executed conventionally without knowledge of the context in which these operations are performed. This lack of context may occasionally lead to incorrect classification of ingress content as either benign or malicious, that is, as false negatives or false positives respectively in relation to malware detection. False negatives may result in malware going undetected and, therefore, failures to issue appropriate security alerts to network administrators or security professionals. False positives may result in security alerts issuing too often, raising the possibility that false positives will overshadow and dilute responses to 'true positives' and render associated remediation misplaced. In extreme situations, false negatives and false positives may impact system performance.

BRIEF DESCRIPTION OF THE DRAWINGS

Embodiments of the invention are illustrated by way of example and not by way of limitation in the figures of the accompanying drawings, in which like references indicate similar elements and in which:

FIG. 4A is an illustrative representation of a data structure as a table, which associates process operations with process parameters for monitored application specific behaviors according to one embodiment of the invention.

FIG. 4B is an illustrative representation of a data structure as a table of events according to one embodiment of the invention.

DETAILED DESCRIPTION

I. Overview

Figure 1:
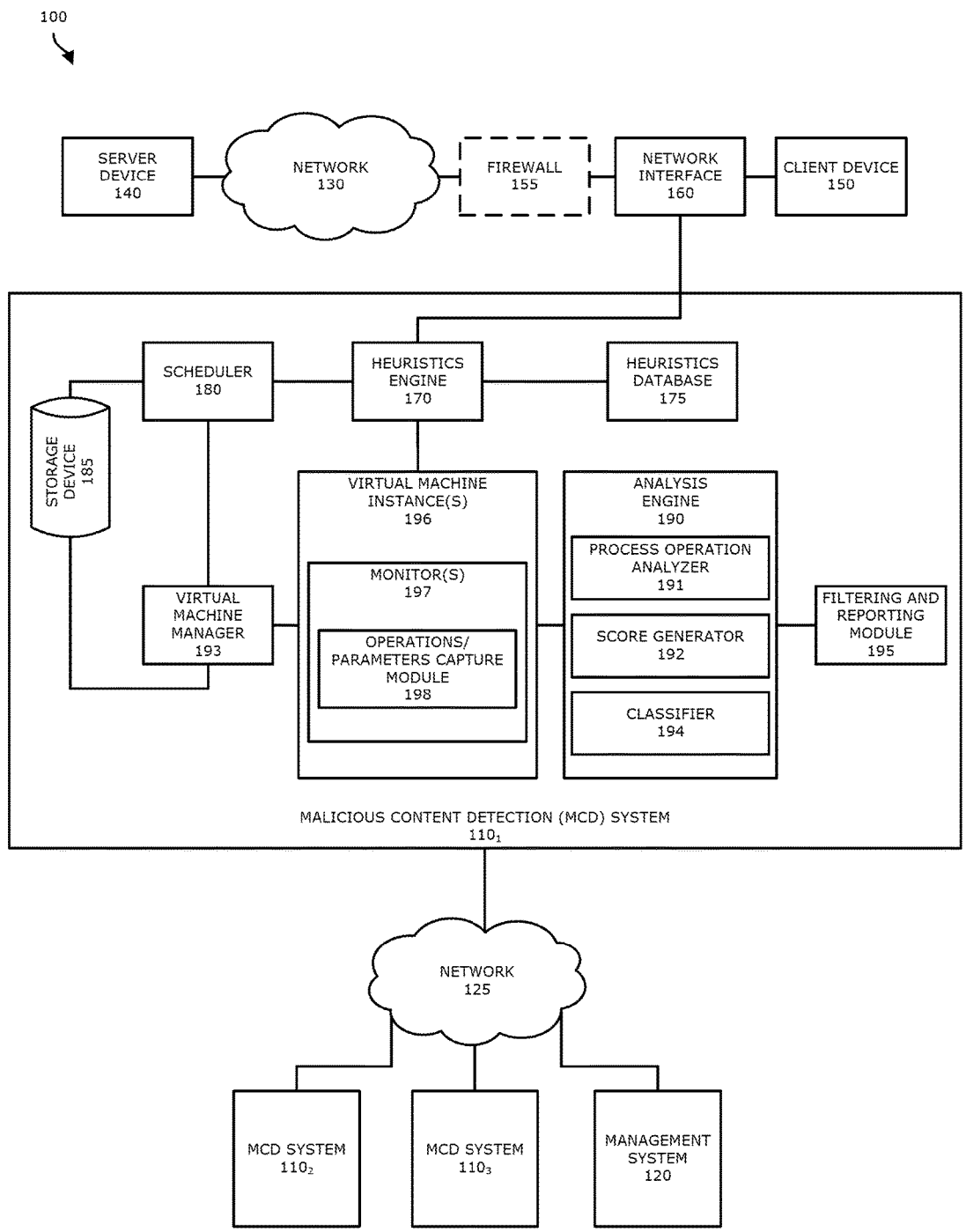
FIG. 1 is an exemplary block diagram of a communication system deploying a plurality of malware content detection (MCD) systems communicatively coupled to a management system via a network according to one embodiment of the invention.

In one embodiment, a malware content detection (MCD) system is provided that intercepts or otherwise captures objects for analysis. Subsequent to optional static analysis, dynamic analysis may be initiated for a suspect object. During this dynamic analysis, a virtual machine (VM) instance may process (e.g., open, load, detonate, and/or run) the suspect object such that process operations associated with the suspect object are performed. The VM instance is provided with monitors to capture activities and other behaviors of the suspect object during processing, and associate the behaviors with specific processes running within the VM instance. The monitors may inspect predefined sets of process operations and associated process parameters to infer and identify application specific behaviors.

A determined application specific behavior combined with a process identifier may be provided to the analysis engine as an event for classification of a suspect object. For example, the suspect object may be classified as malware, non-malware, or as needing further analysis. A confidence score may be generated in arriving at this classification by the analysis engine. The analysis can compare the captured operations and associated parameters with those expected for the particular process (e.g., computer program or application) to identify application specific behaviors that in some cases may indicate malicious activities (exploits). To that end, the analysis may utilize experiential knowledge and machine learned information regarding operations and associated parameters that may ordinarily be expected for each type of application executed in the virtual machine instance.

In some embodiments, one or more stages of analysis (e.g., three are described below) may be used to arrive at a confidence score for a suspect object. A first analysis stage may compare captured operations and associated parameters with those expected for the relevant process, such as by performing a look-up of the captured operation in a table or other data structure of expected operations (called a "whitelist"), a data structure of anomalous operations (called a "blacklist"), or in both a whitelist and blacklist. The results of the first analysis stage may update an event data structure with all captured or developed event information (including information regarding the flagged operation).

A second analysis stage receives the event data structure associated with each captured event as established by the first analysis stage with its determination of application specific behavior (e.g., a flagged operation). The second analysis stage may use all of the captured events including the flagged operation in a state machine based analysis. In this context, a state machine for a process is a representation of the expected sequencing of events that the process may be expected to yield when monitored. The second analysis stage may identify captured operations that are anomalous (not represented in the state machine), operations that should have been monitored and captured but appear to have been omitted, and operations that occurred out of order. A state machine associated with a process may generate additional events based on a partial match of state machine "states" with the observed events. The second analysis stage may update the event data structure to reflect its results. A suitable state machine representation for a process 203 can be developed through analysis of the process 203 and its expected operations and parameters prior to virtual processing of suspect objects. In some embodiments, the second analysis stage may store information in the event data structure associated with objects, or may simply discard the information related to those benign objects. Accordingly, the second analysis stage may act to filter the suspect objects to those that have a certain likelihood of being classified as malware. The likelihood level may be factory set, user set or dynamically determined, and different likelihood levels may be used based on history of malware detection, network traffic conditions, type of process, or other considerations.

A third analysis stage may use pre-defined rules to determine whether the suspect object should be classified as malware. To that end, the rules used in the third analysis stage may be developed through experiential knowledge and machine learning techniques regarding behaviors of known malware and benign objects processed by applications. The third analysis stage may generate a confidence score (e.g., a weight) for each of the suspect objects related to the probability that it is malicious (e.g., the probability that observed behaviors constitute or are associated with an exploit). The confidence score may be based on the recorded operations and process parameters and corresponding application specific behaviors and events that these operations and process parameters yield. The third analysis stage may use the confidence score for each suspect object (or combine confidence scores for plural objects (e.g., of a flow of related packets)) to yield an overall confidence score. The overall confidence score may also reflect, e.g., be generated based in part on, other scores from other analyses (e.g., static or heuristic analysis of the object). The third analysis stage may use that overall confidence score to classify the suspect object or objects as malware.

Where the overall confidence score is not sufficiently high to classify the suspect object as malware (e.g., above a threshold), the object may be classified as benign or as requiring further forensic analysis. A need for further forensic analysis of the suspect object may be indicated when the analysis has reported an event (including an additional event, e.g., from the second analysis) that suggests further analysis may yield a classification other than benign. Where the suspect object is classified as malware, the MCD system may issue an alert or otherwise report its findings, including its confidence score that led to that classification. Security or network professionals may use the information in the report in deciding on remedial actions to be taken in light of the malware.

Utilizing process parameters that describe the context in which a detected process operation was performed provides greater insight into the characteristics of a suspect object. In particular, the detection of a process operation in a first context may be highly indicative of malware while the detection of the same process operation in a second context may provide little or no support for the classification of the object as malware. This improved insight results in a more accurate classification of the suspect object and a reduced number of malware false positives (FPs) and false negatives (FNs). Malware incorrectly classified in conventional detection systems as malicious (FPs) may not be marked malicious in embodiments of the invention based on application specific behavior. The same goes for malware incorrectly classified in conventional detection systems as non-malicious (FNs).

II. Terminology

In the following description, certain terminology is used to describe aspects of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Logic (or engine) may be in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage media may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "object" generally refers to a collection of data, whether in transit (e.g., over a network) or at rest (e.g., stored), often having a logical structure or organization that enables it to be classified for purposes of analysis. During analysis, for example, the object may exhibit a set of expected characteristics and/or, during processing, a set of expected behaviors. The object may also exhibit a set of unexpected characteristics and/or a set of unexpected behaviors that may evidence an exploit or malware and potentially allow the object to be classified as an exploit or malware.

Examples of objects may include one or more flows or a self-contained element within a flow itself. A "flow" generally refers to related packets that are received, transmitted, or exchanged within a communication session. For convenience, a packet is broadly referred to as a series of bits or bytes having a prescribed format, which may include, for example, an HTTP packet, a frame, or a cell.

As an illustrative example, an object may include a set of flows such as (1) a sequence of transmissions in accordance with a particular communication protocol (e.g., User Datagram Protocol (UDP); Transmission Control Protocol (TCP); or Hypertext Transfer Protocol (HTTP); etc.), or (2) inter-process communications (e.g., Remote Procedure Call "RPC" or analogous processes, etc.). Similarly, as another illustrative example, the object may be a self-contained element, where different types of such objects may include an executable file, a non-executable file (such as a document or a dynamically linked library), a Portable Document Format (PDF) file, a JavaScript file, a Zip file, a Flash file, a document (for example, a Microsoft Office® document), an electronic mail (email), a downloaded web page, an instant messaging element in accordance with Session Initiation Protocol (SIP) or another messaging protocol, or the like.

The term "content" generally refers to information transmitted as one or more messages, where each message(s) may be in the form of a packet, a frame, an Asynchronous Transfer Mode "ATM" cell, another object, or any other series of bits having a prescribed format. The content may be received as a data flow.

An "exploit" may be construed broadly as information (e.g., executable code, data, command(s), etc.) that attempts to take advantage of a software vulnerability or user error. Typically, a "vulnerability" is a coding error or artifact of software (e.g., computer program) that allows an attacker to alter legitimate control flow during processing of the software (computer program) by an electronic device, and thus, causes the electronic device to experience undesirable or unexpected behaviors. The undesired or unexpected behaviors may include a communication-based anomaly or an execution-based anomaly, which, for example, could (1) alter the functionality of an electronic device executing application software in a malicious manner; (2) alter the functionality of the electronic device executing that application software without any malicious intent; and/or (3) provide unwanted functionality which may be generally acceptable in another context. To illustrate, a computer program may be considered as a state machine, where all valid states (and transitions between states) are managed and defined by the program, in which case an exploit may be viewed as seeking to alter one or more of the states (or transitions) from those defined by the program.

Malware may be construed broadly as computer code that executes an exploit or otherwise harms or co-opts operation of an electronic device or misappropriates, modifies or deletes data. Conventionally, malware is often said to be designed with malicious intent. An object may constitute or contain malware.

The term "parameter" is often defined as a variable (or, colloquially speaking, a "placeholder") in a computer program that represents any of a number of different values of data to be provided as input to a function or routine of an application, and may also refer to the value or values themselves. In the following description, unless the context demands otherwise, "parameter" will usually be used to denote the value or values. Accordingly, passing a parameter means to provide an input value to the function. For example, a heuristics engine may pass parameters/messages to a virtual machine manager to identify software profile information associated with a needed virtual machine instance. In another example, an operations/parameters capture ("OPC") module within a monitor may pass events and/or application specific events to a filtering and reporting module for additional analysis.

The parameters may include various types of data that may be used to detect malicious behavior. For example, in one case an application specific behavior that may be monitored is the loading/running of macros in a Microsoft Office application. Upon detection of a macro in a Microsoft Office application, an OPC module of a monitor may record the specific module that requested the loading/running of the macro (e.g., an address or identifier of the specific module). This data may define parameter data that is recorded and analyzed along with other data (e.g., macro activity) to determine the presence of malware.

In another example, an application specific behavior that may be monitored is the loading/running of a module that processes dynamic content of a PDF document in an Adobe Reader application. Upon detection of dynamic content in an Adobe Reader application, an OPC module of a monitor may record the values of an associated stack trace. This data may define parameter data that is recorded and analyzed along with other data to determine the presence of malware.

The term "transmission medium" is a communication path between two or more systems (e.g., any electronic device with data processing functionality such as, for example, a security appliance, server, mainframe, computer, netbook, tablet, smart phone, router, switch, bridge or router). The communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

In general, a "virtual machine" (VM) is a simulation of an electronic device (abstract or real) that is usually different from the electronic device conducting the simulation. A VM may be used to provide a sandbox or safe runtime environment separate from a production environment to enable detection of APTs or malware in a safe environment. The VM may be based on specifications of a hypothetical computer or emulate the computer architecture and/or functions of a real world computer.

The term "computerized" generally represents that any corresponding operations are conducted by hardware in combination with software and/or firmware.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

III. General Architecture

Referring to FIG. 1, an exemplary block diagram of a communication system 100 deploying a plurality of malware content detection (MCD) systems $110_1$-$110_N$ (N>1, e.g., N=3) communicatively coupled to a management system 120 via a network 125 is shown. In general, the management system 120 is adapted to manage the MCD systems $110_1$-$110_N$. For instance, the management system 120 may be adapted to cause malware signatures or patterns generated as a result of malware detection by any of the MCD systems $110_1$-$110_N$ to be shared with one or more of the other MCD systems $110_1$-$110_N$, including, for example, where such sharing is conducted on a subscription basis.

Herein, according to this embodiment of the invention, the first MCD system $110_1$ is an electronic device that is adapted to (i) intercept data traffic that is routed over a communication network 130 between at least one server device 140 and at least one client device 150 and (ii) monitor, in real-time, objects within the data traffic. More specifically, the first MCD system $110_1$ may be configured to inspect data objects received via the communication network 130 and identify "suspicious" objects. The incoming objects are identified as "suspicious" when it is assessed, with a certain level of likelihood, that at least one characteristic identified during inspection of the objects indicates or is associated with the presence of malware.

Thereafter, the suspicious objects are further analyzed within a virtual machine (VM) execution environment to detect whether the suspicious objects include malware. The VM execution environment may comprise multiple VM instances 196 supporting the same or different software profiles corresponding to multiple intercepted objects from various sources within the communication system 100. The particulars of this malware analysis performed by the VM execution environment are described in further detail below.

The communication network 130 may include a public computer network such as the Internet, in which case an optional firewall 155 (represented by dashed lines) may be interposed between the communication network 130 and the client device 150. Alternatively, the communication network 130 may be a private computer network such as a wireless telecommunications network, a wide area network, or local area network, or a combination of networks.

The first MCD system $110_1$ is shown as being coupled with the communication network 130 (behind the firewall 155) via a network interface 160. The network interface 160 operates as a data capturing device (referred to as a "tap" or "network tap") that is configured to receive data traffic propagating to/from the client device 150 and provide at least some of the objects (or a copy thereof) associated with the data traffic to the first MCD system $110_1$.

In general, the network interface 160 receives and routes objects that are received from and provided to client device 150 normally without an appreciable decline in performance by the server device 140, the client device 150, or the communication network 130. The network interface 160 may intercept any portion of the data traffic, for example, any number of data packets or other objects. Of course, it is contemplated that the first MCD system $110_1$ may be positioned behind the firewall 155 and in-line with client device 150.

In some embodiments, the network interface 160 may capture metadata from data traffic intended for the client device 150, where the metadata is used to determine whether the data traffic includes any suspicious objects as well as the software profile for such suspicious objects. The metadata may be associated with the server device 140 and/or the client device 150. In other embodiments, a heuristics engine 170 within the first MCD system $110_1$ may determine the software profile by analyzing the objects and/or metadata associated with the data traffic.

It is contemplated that, for any embodiments where the first MCD system $110_1$ is implemented as a dedicated appliance or a dedicated computer system, the network interface 160 may include an assembly integrated into the appliance or computer system that includes network ports, a network interface card and related logic (not shown) for connecting to the communication network 130 to non-disruptively "tap" data traffic propagating through firewall 155 and provide the data traffic to the heuristics engine 170. In other embodiments, the network interface 160 can be integrated into an intermediary device in the communication path (e.g., the firewall 155, a router, a switch or another network device) or can be a standalone component, such as an appropriate commercially available network tap. In virtual environments, a virtual tap (vTAP) may be used to intercept traffic from virtual networks.

Referring still to FIG. 1, the first MCD system $110_1$ may include a heuristics engine 170, a heuristics database 175, a scheduler 180, a storage device 185, an analysis engine 190 (including a process operation analyzer 191, a score generator 192, and a classifier 194), a virtual machine manager (VMM) 193, one or more virtual machine instances 196 (with corresponding monitors 197 and operations/parameters capture modules 198), and a filtering and reporting module 195. In some embodiments, the network interface 160 may be contained within the first MCD system $110_1$. Also, the heuristic engine 170, the scheduler 180, the analysis engine 190, the VMM 193, the filtering and reporting module 195, and/or the virtual machine instances 196 may be software modules executed by a processor that receives the captured objects, performs malware analysis and is adapted to access one or more non-transitory storage mediums operating as the heuristics database 175 and/or the storage device 185. In some embodiments, the heuristics engine 170 may be one or more software modules executed by a processor, and the scheduler 180, the analysis engine 190, the VMM 193, the filtering and reporting module 195, and/or the virtual machines instances 196 may be one or more software modules executed by a different processor, where the two processors are possibly located at geographically remote locations, and communicatively coupled, for example via a network.

Figure 2:
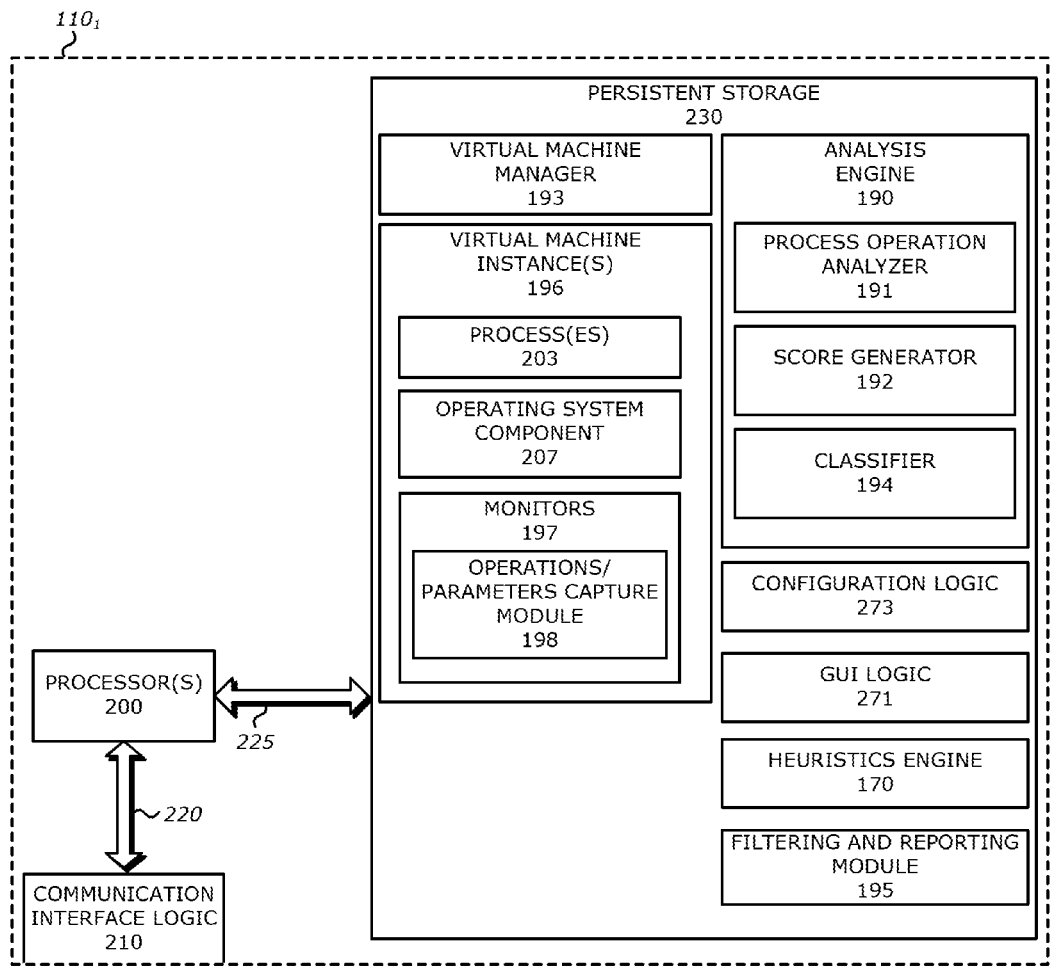
FIG. 2 is an exemplary block diagram of logic employed by an MCD system according to one embodiment of the invention.

Referring now to FIG. 2, an exemplary block diagram of logic associated with the MCD system $110_1$ is shown. The MCD system $110_1$ comprises one or more processors 200 that are coupled to communication interface logic 210 via a first transmission medium 220. Communication interface logic 210 enables communications with other MCD systems $110_2$-$110_N$, the management system 120, and/or other components on the network 130 or the network 125. According to one embodiment of the disclosure, the communication interface logic 210 may be implemented as a physical interface including one or more ports for wired connectors. Additionally, or in the alternative, the communication interface logic 210 may be implemented with one or more radio units for supporting wireless communications with other electronic devices.

The processor(s) 200 is (are) further coupled to persistent storage 230 via transmission medium 225. According to one embodiment of the disclosure, the persistent storage 230 may include the heuristics engine 170, the analysis engine 190, the VMM 193, the filtering and reporting module 195, the one or more VM instances 196, graphical user interface (GUI) logic 271, and configuration logic 273. Of course, when implemented as hardware, engines 170 and 190, module 195, VMM 193, logic 271 and 273, and VM instance(s) 196 may be implemented separately from the persistent storage 230.

In general, the heuristics engine 170 serves as a filter to permit subsequent malware analysis only on a portion of incoming objects (e.g., those that are "suspicious"), which effectively conserves system resources and provides faster response time in determining the presence of malware within analyzed suspicious objects that are more likely to carry, constitute, or be otherwise associated with malware. As an ancillary benefit in some embodiments, by performing a dynamic or run-time analysis in a virtual environment on only the suspicious incoming objects, such analysis may prove more efficient and effective, and, in some cases, monitoring may continue for a longer duration. This may be important for detecting time-delayed malware-related behaviors.

As illustrated in FIG. 1, the heuristics engine 170 receives one or more incoming objects from the network interface 160 and applies heuristics to determine if any of the objects are suspicious. In other words, one or more checks may be conducted in efforts to detect a particular characteristic that may suggest the object under analysis is potentially malicious, where the object may be classified as "suspicious". The heuristics applied by the heuristics engine 170 may be based on data and/or rules stored in the heuristics database 175. Also, the heuristics engine 170 may examine the image of the captured objects without processing, executing, and/or opening the captured objects.

As an example, the heuristics engine 170 may examine the metadata or attributes of the captured objects and/or the code image (e.g., a binary image of an executable) to determine whether a certain portion of the captured objects matches or has a high correlation with a predetermined pattern of attributes that is associated with a malicious attack. According to one embodiment of the disclosure, the heuristics engine 170 flags objects from one or more data flows as suspicious after applying this heuristics analysis.

Thereafter, according to one embodiment of the invention, the heuristics engine 170 may be adapted to transmit at least a portion of the metadata or attributes of the suspicious objects to the VMM 193. Such metadata or attributes are used to identify a software profile to be used by a VM instance 196 needed for subsequent malware analysis. In another embodiment of the disclosure, the VMM 193 may be adapted to receive one or more messages (e.g., data packets) from the heuristics engine 170 and analyze the message(s) to identify the software profile information associated with the needed VM instance 196.

For instance, as an illustrative example, a suspicious object under test may include an email message that was generated, under control of Windows® 7 Operating System, using Windows® Outlook 2007, version 12. The email message further includes a Portable Document Format (PDF) attachment in accordance with Adobe® Acrobat®, version 9.0. Upon determining that the email message includes suspicious content, the heuristics engine 170 provides software profile information to identify a particular type/configuration of a VM instance 196 needed to conduct dynamic analysis of the suspicious content. According to this illustrative example, the software profile information would include (1) Windows® 7 Operating System (OS); (2) Windows® Outlook 2007, version 12; and (3) PDF support through Adobe® Acrobat®, version 9.0.

In another embodiment of the disclosure, the heuristics engine 170 may determine the features of the client device 150 that are affected by the data traffic by receiving and analyzing the objects from the network interface 160. The heuristics engine 170 may then transmit the features of the client device 150 to the scheduler 180, the VMM 193, and/or the analysis engine 190.

Upon determination of the proper software profile, the scheduler 180, the VMM 193, and/or the analysis engine 190 may generate, configure, and run a VM instance 196 based on the determined software profile. The VM instance 196 may include one or more processes 203, an operating system component 207, one or more monitors 197 (including an operations/parameters capture module 198), and other components that are required to process the suspect object (and may, in some embodiments simulate the processing environment of the client device 150), and allow dynamic analysis of a suspect object.

In one embodiment, the VM instance 196 mimics the processing environment on the client device 150 such that a dynamic analysis of an object under examination may be performed. By generating a VM instance 196 that simulates the environment on the client device 105, the VM instance 196 allows the suspect object to be processed in a similar fashion as would be processed on the client device 150 without exposing the client device 150 to potential malicious behaviors of a suspect object.

Figure 3:
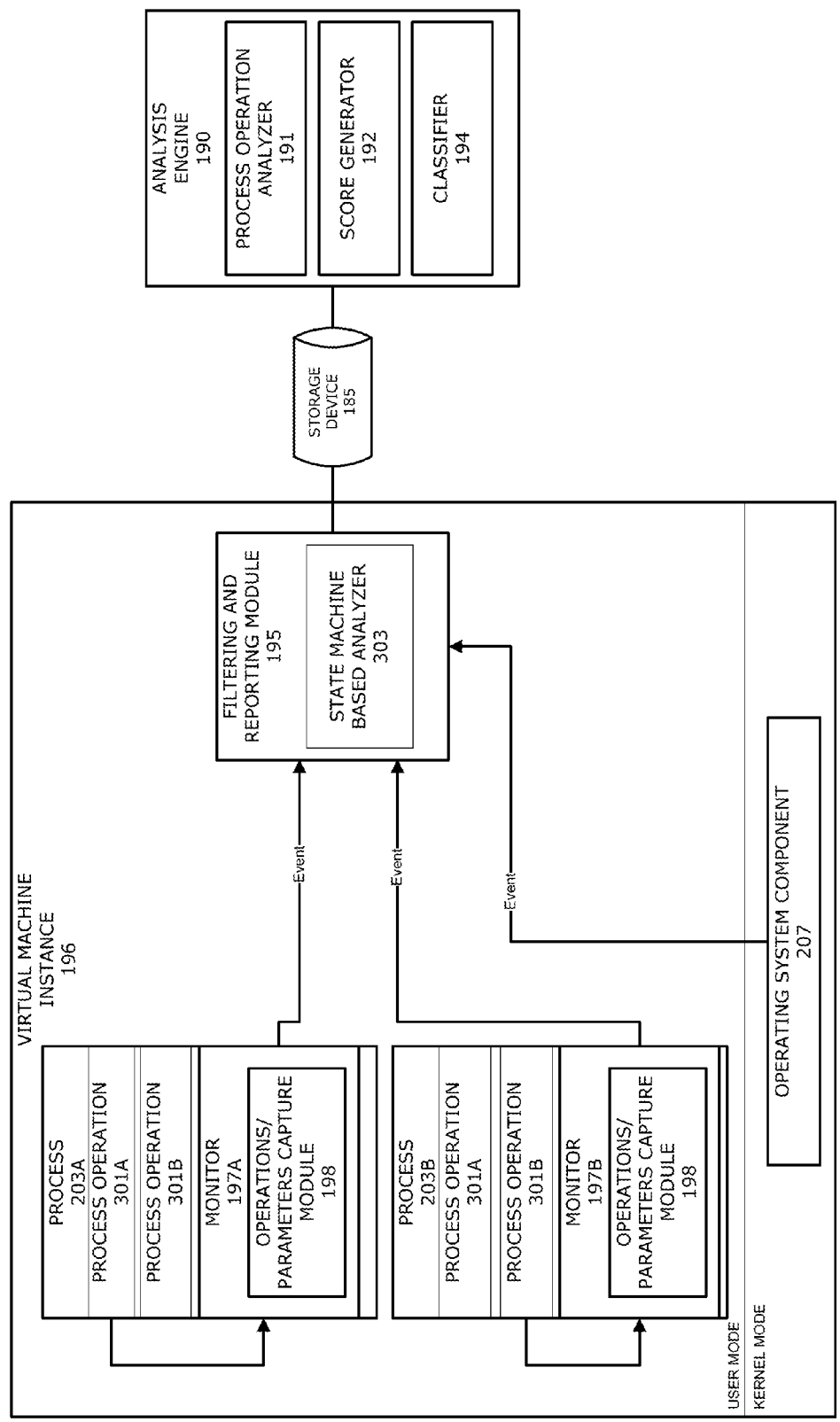
FIG. 3 is an example architecture for a virtual machine (VM) instance that is used to dynamically analyze a suspect object according to one embodiment of the invention.

FIG. 3 shows an example architecture for the VM instance 196 that is used to dynamically analyze a suspect object. As shown, the VM instance 196 may include processes 203A and 203B, operating system component 207, and monitors 197A and 197B, and a filtering and reporting module 195.

The processes 203A and 203B may be any instance or component of a computer program. The processes 203A and 203B may be formed by code and instructions that define process operations. Each of the process operations may be performed at various intervals or points in time based on operating parameters, user inputs, or other factors/stimuli. For example, the process 203A may be an Adobe® reader process that defines multiple process operations. The process operations may include a function call, a process or thread lifecycle operation, a module operation, etc.

The monitors 197A and 197B are portions of code that may be injected within the processes 203A and 203B, respectively, for monitoring operations of interest associated with each process 203A and 203B. Although shown and described in relation to the processes 203A and 203B, monitoring may be similarly performed by operating system component 207 within the VM instance 196. In some embodiments, monitors 197 may be placed outside the VM instance 196. For example, monitors 197 may be placed in the VMM 193 for monitoring process operations and associated process parameters. In one embodiment, the VMM 193 may be a combination of hardware, software, and firmware that creates, runs, and controls the VM instance 196.

In any case, the monitors 197A and 197B, (or other monitoring functions, wherever located) include a novel operations/parameters capture ("OPC") module 198. The OPC module 198 enables the monitors 197A and 197B to inspect or examine operations of the processes 203A and 203B, respectively, during run-time, and capture both the operations and associated parameters for use in malware detection. In some embodiments, the monitors 197A and 197B may be designed or positioned (pre-set) to examine specific, and preferably predefined, operations.

Although described as being inserted during instantiation, in some embodiments, the monitors 197 may be injected/inserted within processes 203 prior to instantiation of the VM instance 196. In this fashion, processes 203 with monitors 197 may be retrieved from storage during instantiation of the VM instance 196 without the need for monitor 197 insertion.

For example, the MCD system $101_1$ may in some embodiments inject a first monitor 197A into an Adobe® reader process 203A running within a VM instance 196 or may in other embodiments instantiate the VM instance 196 with a first monitor 197A injected into or otherwise located (i.e., positioned) to monitor behaviors of the Adobe® reader process 203A. The first monitor 197A may examine and capture a first set of process operations and process parameters associated, for example, with an Adobe® reader process 203A.

The MCD system $101_1$ may in some embodiments also inject a second monitor 197B into a Firefox® web-browser process 203B running within the VM instance 196 or may in other embodiments instantiate the VM instance 196 with a second monitor 197B injected into or being otherwise positioned to monitor behaviors of a Firefox® web-browser process 203B. The second monitor 197B may examine and capture a second set of process operations and associated process parameters associated with the Firefox® web-browser process 203B. In this example embodiment, the first and second sets of process operations and associated process parameters may have been preselected for each associated process 203 (e.g., Adobe® reader and Firefox® web-browser) to indicate the occurrence of application specific behaviors.

For example, the processes 203A and 203B may each include the process operations 301A and 301B. In this example, the monitor 197A is preset to monitor process operation 301A based on association with the process 203A. Similarly, the monitor 197B is preset to monitor process operation 301B within the process 203B. The decision on which process operations 301 to monitor may be preconfigured based on known malware. The monitors 197A and 197B may also monitor and record process parameters associated with process operations.

Referring now to FIG. 4A, an exemplary table that associates processes 203 and process operations 301 with process parameters is shown. Each of these process parameters may be examined and recorded upon detection of an associated process operation 301 in a process 203. For example, upon the detection of performance of process operation 301A in process 203A, the monitor 197A may record the status of one or more predefined process parameters that are associated with the process operation 301A and/or the process 203A. The process parameters describe the context in which the process operation 301A was performed. By recording the context of a performed process operation 301, the MCD system $101_1$ may better analyze suspect objects and reduce the occurrence of false positives of malware. For example, while in certain contexts the performance of the process operation 301A may indicate a malware object, in other contexts the performance of the process operation 301A may not indicate a malware object.

In one embodiment, the monitors 197A and 197B may compare recorded process parameters for a process operation with a set of predefined values, which may be derived through experimentation and/or machine learning. Upon detecting a match between the recorded process parameters and the set of predefined values, the corresponding monitor 197 may flag the process operation and recorded process parameters as an application specific behavior that may be useful in determining whether the suspect object is malware. In other embodiments, the monitors 197 may send all recorded process parameters to logic that performs the foregoing comparison with predefined values. The application specific behavior may be reported to the filtering and reporting module 195 as an event. The event describes the process 203 within which the application specific behavior was detected and the application specific behavior itself.

FIG. 4B depicts an illustrative representation of a data structure, for our purposes, in table form, of seven events as stored in storage device 185 corresponding to seven monitored application specific behaviors numbered ASB 1 through 7, each of which, in turn, corresponds to one of four processes 203A-D. More specifically, as shown in the table of FIG. 4B, for each process 203A-D, a detected process operation 301A-G and a corresponding set of process parameters 1-6 define an application specific behavior 1-7. When combined with a process identifier, these application specific behaviors define events. The application specific behaviors may include the loading of a module within a process 203 (e.g., the loading of a script processing module by an Adobe® reader process or the loading of a macros module by a Microsoft Office® process), a system call by a process 203, etc., where the loading and system call operations, for example, are captured by corresponding monitors 197 pre-set to capture them. These are but examples of the types of operations that may be monitored; other operations may be monitored as will be apparent to those skilled in the art.

Referring back to FIG. 2, in one embodiment, the filtering and reporting module 195 may receive one or more events from separate monitors 197, which have been injected within separate processes 203, components of the operating system component 207, or other portions of the VM instance 196. The filtering and reporting module 195 may store these events in the storage device 185 as shown in FIG. 3. The analysis engine 190 may thereafter access these stored events. In one embodiment, the analysis engine 190 may include a score generator 192 that uses the stored events to determine a score for the associated suspect object, which relates to the probability that the suspect object is a malware object. The analysis engine 190 may also include a classifier 194, which determines a classification for an associated suspect object (e.g., malware or non-malware) based on the score. The classifier 194 may classify the suspect object as malware if the associated score exceeds a first threshold. When the associated score is below the first threshold, the score may be compared against a second lower threshold and the events/application specific behaviors may be analyzed to determine if further analysis is needed for the suspect object. For this, the analysis engine 190 may include a process operation analyzer 191 that analyzes the logged operations and parameters associated with the logged behaviors/events to assess whether the suspect object may be classified as malware based on the process and context that yielded those log entries.

Accordingly, for example, where the suspect object has an associated score of 7 out of 10, and the first threshold is set at 6 out of 10, the suspect object may be classified as malware. Where the suspect object has an associated score of 5 out of 10, and the first threshold is set at 6 out of 10, the suspect object's associated score may be compared against a second threshold and the suspect objects events/application specific behaviors may be analyzed to determine whether the suspect object may be classified as requiring further analysis by the process operation analyzer 191.

As will be described in further detail below, these scores and classifications may be based on traversal of state machines by a state machine based analyzer 303 within the filtering and reporting module 195. In one embodiment, the generated score may be associated with the suspect object, stored in the storage device 185, and reported to a user, a network administrator, and/or a security professional by the reporting module 195.

As described above, the communication system 100 monitors and records process operations and process parameters of an associated process. By selectively recording process operations and process parameters of an associated process within a VM instance 196, the communication system 100 may better understand the context of process operations and generate more intelligent classifications for associated objects.

In some embodiments, the MCD system $101_1$ may include one or more stages of analysis (e.g., three are described below) in arriving at a confidence score for a suspect object as described above. The analysis stages may be performed in separate analysis engines 190, one per stage, or may be executed by a different number of analysis engines 190 in various embodiments by omitting, combining or dividing steps or stages. The analysis stages may be performed sequentially or concurrently (in an overlapping fashion). The analysis stages may be performed by a single processor or by separate processors, which may be located within the same device or appliance or located remotely from one another, and may communicate over a communication link or network.

Figure 5:
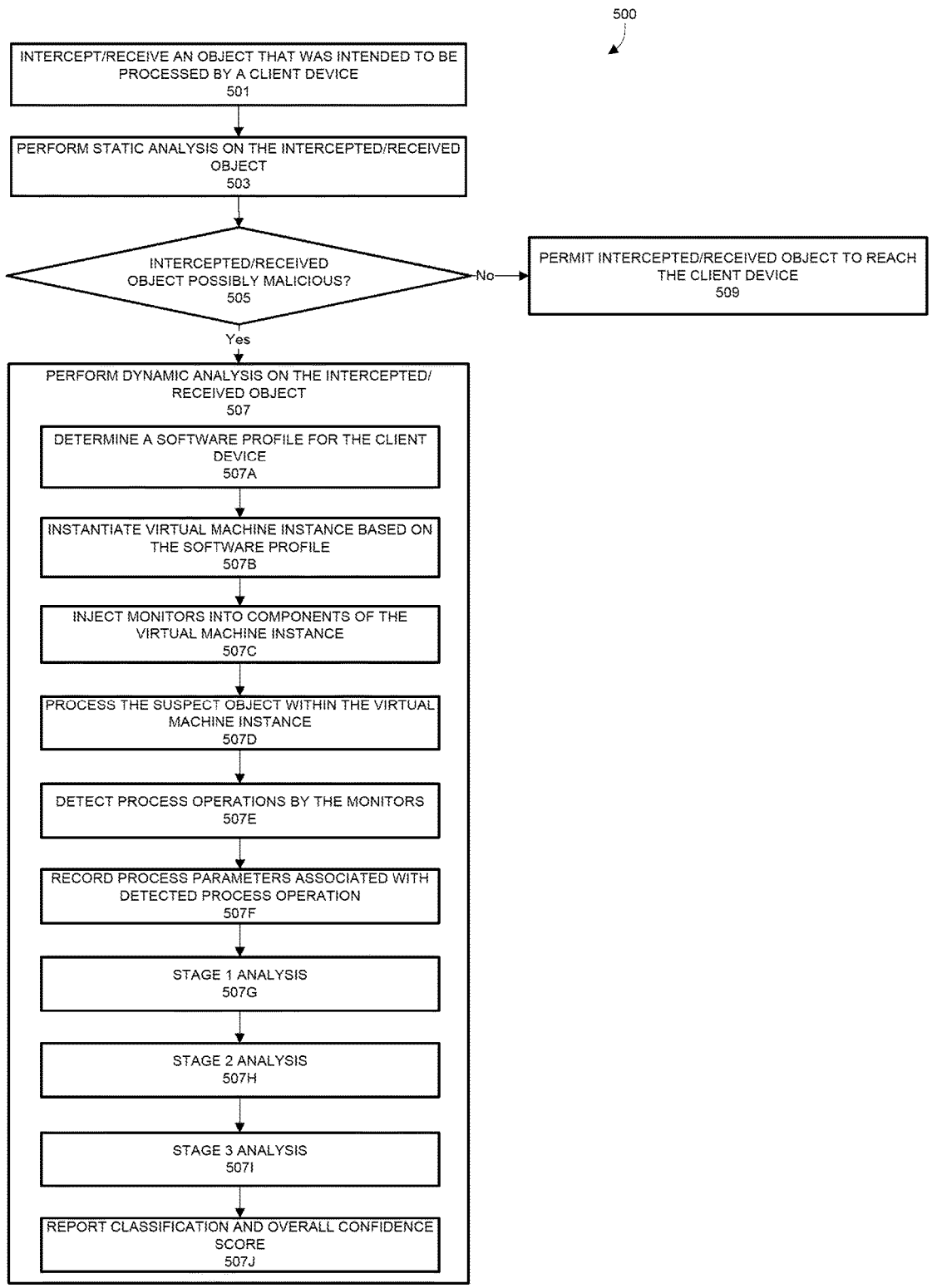
FIG. 5 shows an exemplary method for detecting malware according to one embodiment of the invention.

Turning now to FIG. 5, a method 500 for detecting malware using a multistage analysis will now be described. Each operation of the method 500 may be performed by one or more components of the MCD system $110_1$ described above. For example, the operations of the method 500 may be performed by the heuristics engine 170, the VM instance 196, the VMM 193, the analysis engine 190, and the filtering and reporting module 195. In other embodiments, the operations of the method 500 may be performed in full or in part by other components of the communication system 100 shown in FIG. 1.

The method 500 may commence at operation 501 with receipt of a suspect object to be analyzed. The suspect object may be intercepted by the network interface 160 and passed (or copied and passed) to the MCD system $110_1$ for analysis. In another embodiment, an anti-malware system running on the client device 150 may periodically or aperiodically (i.e., from time to time) and without direct provocation by the user intercept and transmit an object to the MCD system $110_1$ for processing and analysis. This independent interception and analysis of objects allows the client device 150 to maintain an automatic examination of potential malware content received without direct interaction by a user.

In another embodiment, a user of the client device 150 may submit objects through a user interface. The interface may be generated by the GUI logic 271 and served to the client device 150 by the configuration logic 273 of the MCD system $110_1$. In this fashion, the MCD system $110_1$ may operate as a web-server to deliver data and a user interface to the client device 150.

Figure 6A:
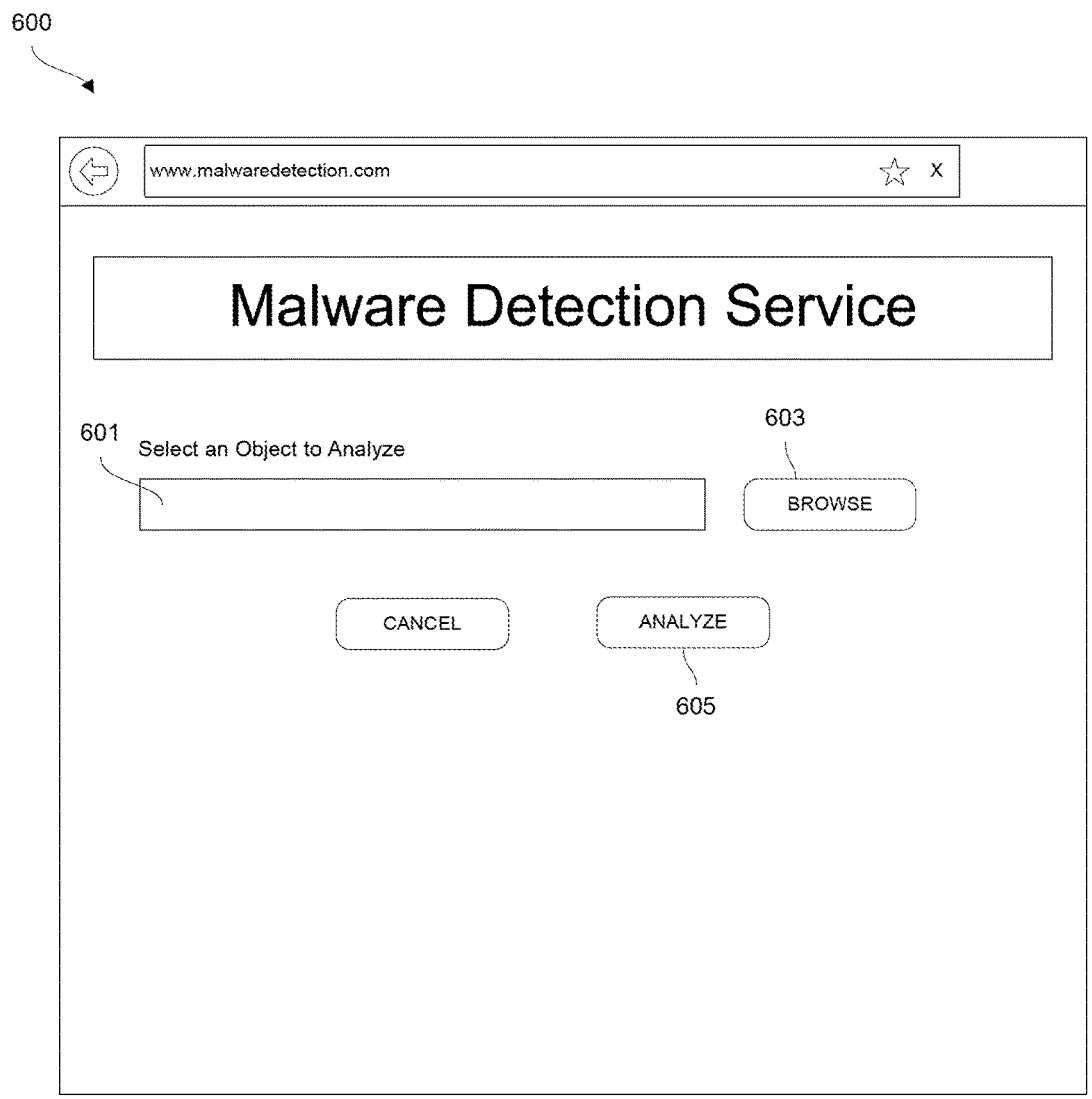
FIG. 6A shows an example user interface for entering information for a suspect object according to one embodiment of the invention.
Figure 6B:
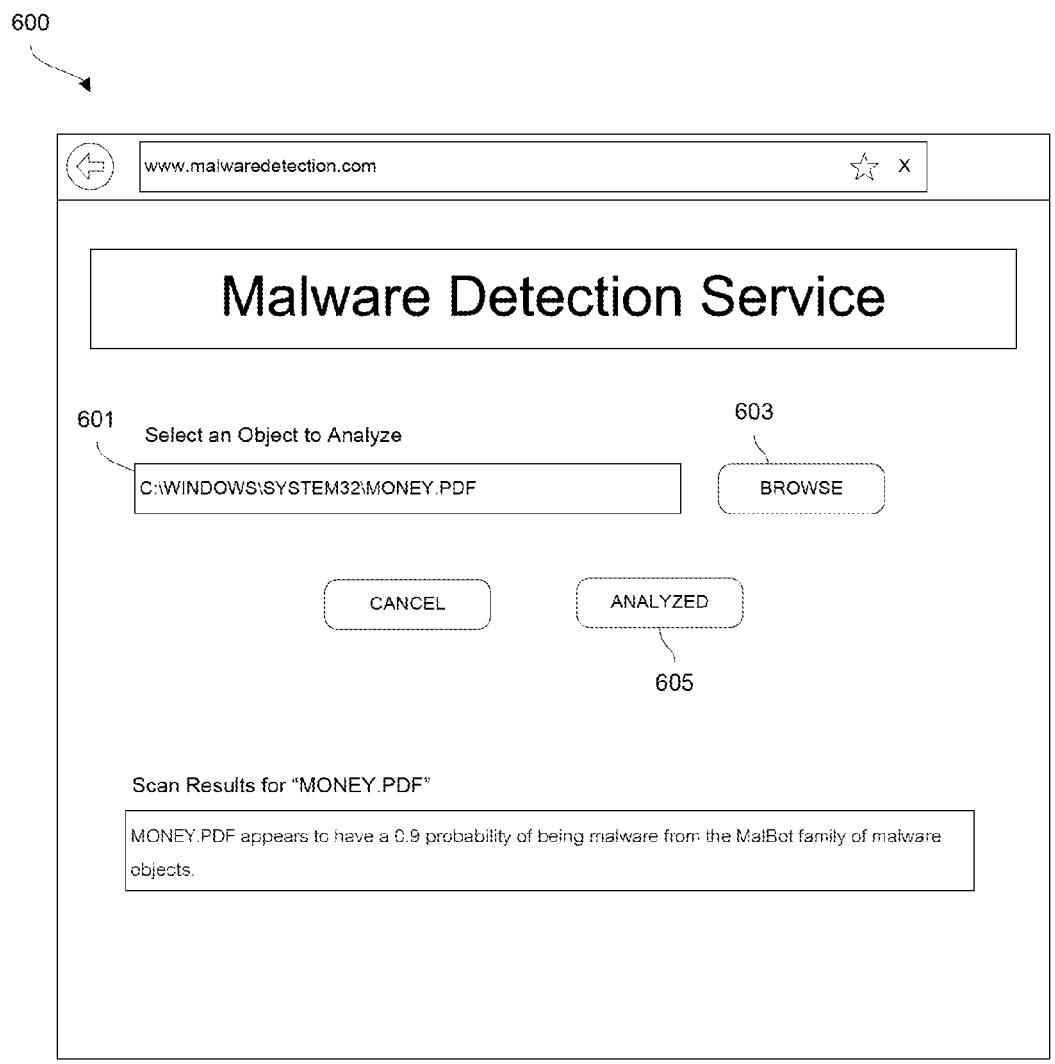
FIG. 6B shows the example user interface of FIG. 6A after a warning message has been returned to a user according to one embodiment of the invention.

FIG. 6A shows a web-interface 600 for submitting objects to the MCD system $110_1$ for analysis according to one embodiment. In this example interface 600, a user may direct a web-browser running on the client device 150 to view the web-interface 600. The user may thereinafter enter the address/location of an object into the web-interface 600 using the address input field 601 and the "BROWSE" button 603. The entered address indicates the location of the object in storage on the client device 150 or on a remote device (e.g., stored on a website). After selection of an object for analysis, the user may submit the selected object for analysis by selecting the "ANALYZE" button 605 in the web-interface 600. The selected object may be transmitted from the client device 150 such that it is received by the MCD $110_1$ for processing as described above at operation 501.

In one embodiment, the object received/intercepted at operation 501 may be any digital data structure. For example, the object may be a file (e.g., PDF document), a component of a file, a component of a web page, an image, a series of captured network/web traffic that is capable of being replayed, etc. As described above, a user of the client device 150 may manually determine that an object is suspected to be malware or the client device 150 may automatically classify the object as potential/suspected malware and transmit the object to the MCD system $110_1$.

Referring back to FIG. 5, although described in relation to receiving a single object, in other embodiments, the method 500 may be used in relation to multiple objects received simultaneously or in rapid succession. For example, the method 500 may be used to analyze multiple objects (or a flow) received from the client device 150 or other devices on the network 130. The objects may be processed by the method 500 separately to determine whether each received object is malware based on detected operations and associated process parameters as described in greater detail below.

Following interception and/or receipt of an object, operation 503 may perform a static analysis on the received object using the heuristics engine 170 and/or the heuristics database 175. As described above, this static analysis filters for content that is suspected to contain malware code. In general, this static analysis filtering serves to permit subsequent dynamic malware analysis only on a portion of incoming content, which effectively conserves system resources and provides faster response time in determining the presence of malware within analyzed content. When the object being analyzed is not suspected at operation 503 to be malware, operation 509 may permit the intercepted/received object to reach the client device 150 or, where the heuristic analysis is performed on a copy, to discard the copy and otherwise terminate the method 500 for this object and permit the client device 150 to proceed as normal. Conversely, when operation 505 determines that the object may be malicious based on the static analysis performed at operation 503, one or more stages of a dynamic analysis may be performed on the suspect object as described below at operation 507.

The dynamic analysis performed at operation 507 may include the use of the VM instance 196 to process the suspect object. In one embodiment, one or more monitors 197 are injected into or reside in components of the VM instance 196 (e.g., processes 203, etc.), or are otherwise positioned within the VM instance 196 so as to be able to monitor processing of the suspect object. More specifically, the monitors 197 monitor a predefined set of process operations and associated process parameters of their associated process. Utilizing process parameters that describe the context in which a detected process operation was performed allows the dynamic analysis greater insight into the characteristics of the suspect object. This improved insight results in a more accurate classification of the suspect object and a reduced number of malware false positives.

As shown in FIG. 5, the dynamic analysis may commence at sub-operation 507A with the determination of a software profile for the client device 150. This "software profile" includes information that is used for virtualization of the client device 150, which was intended to receive the suspect object, or simply a processing environment required to process the suspect object. The software profile may include a guest operating system "OS" type and/or version; application type(s) and version(s); virtual device(s), etc. The software profile may be determined at sub-operation 507A by examining the suspect object, other content intended for the client device 105, and/or content transmitted from the client device 150.

Following sub-operation 507A, sub-operation 507B instantiates the VM instance 196 based on the determined software profile. The VM instance 196 may include an operating system component 207, one or more processes 203, and other components that simulate the processing environment. By generating and configuring the VM instance 196 to simulate the environment on the client device 150, the method 500 allows the suspect object to be processed without exposing the client device 150 to potential malicious behaviors.

Upon instantiating/running the VM instance 196, sub-operation 507C injects one or more monitors 197 into one or more components of the VM instance 196. For example, as shown in FIG. 3, the monitors 197A and 197B may be injected within the processes 203A and 203B, respectively. Although shown and described in relation to the processes 203A and 203B, the monitoring may be similarly performed by components of an operating system component 207 within the VM instance 196. In one embodiment, the monitors 197 are portions of code that monitor operations of interest associated with components of the VM instance 196 and record associated process parameters. For example, in the example shown in FIG. 3, the monitors 197A and 197B have been inserted within the processes 203A and 203B, respectively. The monitors 197 may be associated with a set of predefined process operations and associated process parameters that are to be monitored by each respective monitor 197 within the associated processes. The predefined process operations and associated process parameters may be preselected based on known malware and exploits.

Although described as being inserted during/after instantiation, in some embodiments, the monitors 197A and 197B may be injected/inserted within processes 203A and/or 203B or components of the operating system component 207 prior to instantiation of the VM instance 196. For example, the monitors 197A and 197B may reside within the computer programs such as computer applications or operating systems or virtual machine managers for use in instantiating a VM instance 196. In this fashion, processes 203 (or the computer programs) with the monitors 197A and 197B already inserted may be retrieved from storage during instantiation of the VM instance 196 without the need for the monitors 197A and 197B to be inserted at sub-operation 507C.

Continuing with the dynamic analysis, at sub-operation 507D, the suspect object is detonated, opened, run, or otherwise processed within the VM instance 196. Sub-operation 507D may include the processing of the suspect object by one or more components of the VM instance 196 (e.g., one or more of the processes 203A and 203B or an operating system component 207). For example, when the suspect object is a PDF file, an Adobe® reader process may be used to open the suspect object. Opening the PDF file using the Adobe® reader process allows the suspect object to perform process operations and alter process parameters associated with the suspect object such that further analysis may be performed regarding potential malicious code/content contained within the suspect object.

At sub-operation 507E, each of the injected monitors 197 attempts to detect an associated process operation. As noted above, each monitor 197 monitors a different set of process operations based on their associated process 203 within the VM instance 196. In some embodiments, the process operations monitored by each monitor 197 may overlap. In one embodiment, process operations are detected through the use of hooks, which intercept function calls or messages generated by corresponding process operations during their performance.

Upon detection of a process operation by a monitor 197 at sub-operation 507E, sub-operation 507F may record the values of one or more process parameters associated with the detected process operation. As described above, FIG. 4A shows a table that associates process operations with process parameters. Each of these process parameters may be examined and recorded upon detection of an associated process operation at sub-operation 507F. For example, upon the detection of performance of process operation 301A, the monitor 197A may record the status of one or more predefined process parameters that are associated with the process operation 301A and/or the process 203A. The process parameters describe the context with which the process operation was performed. For example, the process parameters may describe modules operating within the VM instance 196 and/or data loaded into memory when the process operation was detected at sub-operation 507E. By recording the context of a performed process operation, the method 500 may better analyze suspect objects and reduce the occurrence of false positives of malware. For example, while in certain contexts the performance of the process operation 301A may indicate a malware object, in other contexts the performance of the process operation 301A may not indicate a malware object.

Following recordation of process parameters for a detected process operation, one or more stages of analysis may be performed for the suspect object. For example, a first stage of analysis may be performed at sub-operation 507G. During this first stage of analysis, operations and associated parameters may be compared with those expected for the relevant process, such as by performing a look-up of the captured operation in a table or other data structure of expected operations (called a "whitelist") for the process. Other embodiments may perform a look-up in a data structure of anomalous operations (called a "blacklist"), or in both a whitelist and blacklist. Suspicious operations are those not matching whitelist entries or those matching blacklist entries, depending on the embodiment. The first analysis stage may be performed by logic located within or associated with a monitor 197 (e.g., the OPC module 198). Since the monitor 197 may avail itself of such logic, it may be referred to herein as an "inference monitor." The results of the first analysis stage may update a corresponding event data structure with all captured or developed event information (including information regarding the flagged operation and an associated application specific event), which may be arranged and accessed, for example, by a process identifier and/or an event identifier. The event data structure may be located in a local storage device (e.g., the storage device 185) or in a central or remote storage device.

Figure 7:
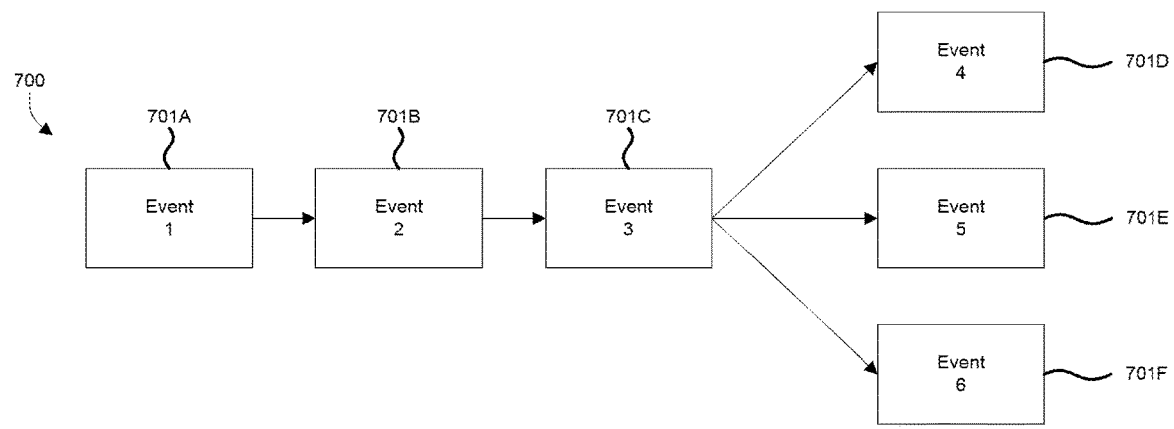
FIG. 7 shows a state machine that is associated with a process within the VM instance according to one embodiment of the invention.

Following sub-operation 507G, a second stage of the analysis may be performed at sub-operation 507H. The second stage of analysis may receive the event data structure associated with each captured event as established by the first analysis stage with its determination of application specific behavior (e.g., a flagged operation). The second analysis stage may use all of the captured events including the flagged operation in a state machine based analysis. In this context, a state machine for a process 203 is a representation of the expected sequencing of events that the process 203 may be expected to yield when monitored. For example, FIG. 7 shows a state machine 700 that is associated with a process 203 within the VM instance 196. The state machine 700 may be composed of a set of states 701A-701F respectively associated with events 1-6 as shown. Using the example provided above, the state machine 700 may be associated with an Adobe® reader process 203.

The second analysis stage may identify captured operations that are anomalous (not represented in the state machine), operations that should have been monitored and captured but appear to have been omitted, and operations that occurred out of order. These identified operations and anomalous occurrences may include the flagged operation as well as one or more additional captured operations that appear anomalous based on the state machine analysis (even if they were not flagged in the first analysis stage). The state machine associated with the process 203 may generate additional events based on a partial match of state machine "states" with the observed events. The second analysis stage may update the event data structure to reflect its results. A suitable state machine representation for a process 203 can be developed through analysis of the process 203 and its expected operations and parameters prior to virtual processing of suspect objects. In some embodiments, the second analysis stage may store information in the event data structure associated with objects, or may simply discard the information related to those benign objects. Accordingly, the second analysis stage may act to filter the suspect objects to those that have a certain likelihood of being classified as malware. The likelihood level may be factory set, user set or dynamically determined, and different likelihood levels may be used based on history of malware detection, network traffic conditions, type of process, or other considerations. The second analysis stage may be performed by the state machine based analyzer 303 that resides within the filtering and reporting module 195. The filtering and reporting module 195 may be located within the virtual machine instance 196, within an associated virtual machine manager (VMM) 193 of the MCD system $101_1$ or within a controller external to the virtual machine instance 196 and the VMM 193, depending on the embodiment. Other forms of analysis may be used in substitution for or in addition to the state machine analysis to filter the captured operations.

Following sub-operation 507H, a third stage of the analysis may be performed at sub-operation 507I. This third analysis stage may obtain an event data structure directly from the second stage or by accessing a memory or other storage device that stores the event data structure (e.g., the storage device 185). The third analysis stage may use pre-defined rules to determine whether the suspect object should be classified as malware. To that end, the rules used in the third analysis stage may be developed through experiential knowledge and machine learning techniques regarding behaviors of known malware and benign objects processed by applications. The third analysis stage may generate a confidence score (e.g., a weight) for each of the suspect objects related to the probability that the suspect object is malicious (e.g., the probability that observed behaviors constitute or are associated with an exploit). The third analysis stage may use the confidence score for each suspect object (or combine confidence scores for plural objects (e.g., of a flow of related packets)) to yield an overall confidence score. The overall confidence score may also reflect, e.g., be generated based in part on, other scores from other analyses (e.g., static or heuristic analysis of the object). The third analysis stage may use that overall confidence score to classify the suspect object or objects as malware. In one embodiment, this confidence score is generated by the score generator 192.

Where the overall confidence score is not sufficiently high to classify the suspect object as malware (e.g., above a threshold), the object may be classified as benign or as requiring further forensic analysis. This classification and score may be reported to a user, a network administrator, and/or a security professional at operation 507J. When the object is classified as benign, the intercepted/received object may be permitted to reach the client device 150 or, where the analysis is performed on a copy, to discard the copy and otherwise terminate the method 500 for this object and permit the client device 150 to proceed as normal. A need for further forensic analysis of the suspect object may be indicated when the analysis has reported an event (including an additional event, e.g., from the second analysis) that suggests further analysis may yield a classification other than benign.

Where the suspect object is classified as malware, the MCD system $101_1$ may issue an alert or otherwise report its findings, including its confidence score that led to that classification at operation 507J. Security or network professionals may use the information in the report in deciding on remedial actions to be taken in light of the malware.

Utilizing process parameters that describe the context in which a detected process operation was performed provides greater insight into the characteristics of a suspect object. In particular, the detection of a process operation in a first context may be highly indicative of malware while the detection of the same process operation in a second context may provide little or no support for the classification of the object as malware. This improved insight results in a more accurate classification of the suspect object and a reduced number of malware false positives (FPs) and false negatives (FNs). Malware incorrectly classified in conventional detection systems as malicious (FPs) may not be marked malicious in embodiments of the invention based on application specific behavior. The same goes for malware incorrectly classified in conventional detection systems as non-malicious (FNs).

The embodiments of the invention can be further understood through the following examples that illustrate the benefits of using application specific behavior to provide context for classifying suspect objects.

"Malware to Non-Malware" Example

Monitors 197 capture operations performed by an application being processed (i.e., a process 203) and assess these operations in light of those expected for the application (i.e., application specific behavior). Though suspicious in some contexts (e.g., if dynamic content were loaded), the operations are not suspicious for the process 203 running. The captured information (regarding the process 203, operations, and parameters as obtained by the monitors 197) is passed to the filtering and reporting module 195. In some embodiments, the filtering and reporting module 195 decides against conducting a state machine analysis and the event is dropped from further analysis. In other embodiments, the event is subjected to state machine analysis, where either (i) the benign characterization of the object may be confirmed and the event then dropped from further analysis (filtered out) and not reported out by the filtering and reporting module 195 to the analysis engine 190, or (ii) the event information for the object is stored in a storage device (e.g., the storage device 185) with a likely low level of suspicion (e.g., low weight or score). The analysis engine 190 (and specifically, its classification logic, classifier 194, or score generator 192) may generate an overall score for a suspect object based on events from the filtering and reporting module 195 and compare this score to a threshold, and may determine that the threshold was not met so the object should be classified as non-malware. In other words, practice of the invention in this embodiment may result in the MCD system 101$_1$ assigning a weight or score in light of the application being run and its analysis of the observed operations and parameters that may have the effect of classifying the object as non-malicious where, without the contribution of the context information, the object may have been falsely designated as malicious (false positive).

"Requires Further Analysis" Example

Monitors 197 observe a potential heap spray operation, but conditions make the characterization of the type of operation less than certain. This information is passed to the filtering and reporting module 195. State machine analysis sees dynamic content of a PDF document was loaded in an Adobe Reader application, but a decision is made that the observed operations are not enough to classify the object as malware. In the light of the loading of dynamic content (which is a known vehicle for exploits), the filtering and reporting module 195 generates an additional event related to that operation after matching observed events against states of the state machine, and stores the event in the storage device 185. If the analysis engine 190 assigns an overall confidence score to the object that is below the threshold to classify the object as malicious and one or more additional events are received from the filtering and reporting module 195, the analysis engine 190 may be in a position to classify the object as requiring further analysis, perhaps with longer analysis in virtual machine instance 196. Consequently, the practice of the invention in this embodiment may result in the system 101$_1$ assigning a weight or score in light of the observed application being run and its analysis of the observed operations and parameters that may have the effect of raising the probability that the object is malware, and possibly classifying the object as requiring further analysis, where, without the contribution of the context information (e.g., dynamic content of a PDF document loaded in an Adobe Reader application), the object may have been falsely designated as non-malicious (potential false negative, depending on the outcome of the further analysis).

"Non-Malware to Malware" Example

Monitors 197 observe operations including crashing of an application during processing within the virtual machine instance 196, and determine that crashing of the particular application is unusual or unexpected absent malware. (Some applications are known to crash frequently for non-malicious reasons (e.g., coding issues) so crashing in and of itself may actually be deemed expected). The monitors 197 pass this information to the filtering and reporting module 195. The state machine analysis determines that certain operations performed prior to the application crashing support the conclusion that the object is at least suspicious. The filtering and reporting module 195 stores this information along with an event score in the storage device 185. The analysis engine 190 classifies the object as malware, based on a total score for the object being over a malware threshold. Accordingly, the practice of the invention in this embodiment may result in the system 101$_1$ assigning a weight or score in light of the application being run and its analysis of the observed operations and parameters that may have the effect of raising the probability that the object is malware, and possibly classifying the object as malware where, without the contribution of the context information, the object may have been falsely designated as non-malicious (potential false negative). For example, process parameters may indicate that macros were loaded in a Microsoft Office application. In this case, tracking macro activity allows deeper inspection of an associated object. Accordingly, the object may be classified/reclassified as malicious and a false negative may be avoided.

As described above, the method 500 and system 101$_1$ monitors and records process operations and process parameters using one or more monitors 197 within a VM instance 196. By selectively recording process operations and process parameters within a VM instance 196, the method 500 and system 101$_1$ may better understand the context of process operations and generate more intelligent classifications for associated objects.

What is claimed is:

1. A computerized method for classifying an object based on detected process operations and associated process parameters that describe the context of the process operations, comprising:
    performing a first analysis of the object within a first electronic device, the first electronic device includes logic that conducts an analysis of attributes associated with the object; and
    performing a second analysis of the object within a second electronic device, the second analysis comprises
        performing dynamic analysis on the object, wherein the dynamic analysis includes:
            processing the object within a virtual machine,
            detecting, by a monitor, a process operation during the processing of the object within the virtual machine, and
            determining a behavior corresponding to an event including at least information associated with the process operation and a corresponding set of process parameters associated with the process operation, wherein the set of process parameters defines a context in which the process operation was performed within the virtual machine when the process operation is detected,
            generating a probability the behavior is suspicious based on a comparison of the process operation and the set of process parameters with at least one of (i) a set of expected process operations and process parameters, or (ii) a set of anomalous process operations and process parameters, and
        responsive to the probability being equal to or above a first predefined level, classifying the object as malware.

2. The computerized method of claim 1, wherein the process operation and the set of process parameters are pre-selected based on a location within the virtual machine in which the monitor is located.

3. The computerized method of claim 1, wherein the process operation includes a function call.

4. The computerized method of claim 1, wherein the set of process parameters defines one or more of a state of modules within the virtual machine.

5. The computerized method of claim 1, wherein a component in which the monitor is located is a process running within the virtual machine.

6. The computerized method of claim 1, wherein the process operation includes a process/thread lifecycle operation.

7. The computerized method of claim 1, wherein a component in which the monitor is located corresponds to a portion of an operating system running in the virtual machine.

8. The computerized method of claim 1, wherein a component in which the monitor is located corresponds to a virtual machine manager (VMM) running outside the virtual machine.

9. The computerized method of claim 1, wherein the first analysis is a static analysis conducted without execution of the object.

10. The computerized method of claim 1, wherein the second electronic device is remotely located from the first electronic device.

11. A system comprising:
a first electronic device that is configured to perform a first analysis of an incoming object, the first analysis includes an analysis of attributes associated with the object, where results of the analysis are used, at least in part, to determine if the object includes malware; and
a second electronic device communicatively coupled to the first electronic device, the second electronic device comprises
one or more hardware processors;
a memory including one or more software modules that, when executed by the one or more hardware processors:
perform dynamic analysis on the object, wherein the dynamic analysis includes (i) processing the object within a virtual machine, (ii) detecting, by a monitor, a process operation during the processing of the object within the virtual machine, and (iii) determining a behavior corresponding to an event including at least information associated with the process operation and a corresponding set of process parameters associated with the process operation, wherein the set of process parameters defines a context in which the process operation was performed within the virtual machine when the process operation is detected,
generate a probability that the behavior is suspicious based on a comparison of the process operation and the set of process parameters with at least one of (i) a set of expected process operations and process parameters, or (ii) a set of anomalous process operations and process parameters, and
responsive to the probability being equal to or above a first predefined level, classify the object as malware.

12. The system of claim 11, wherein the first electronic device is configured to perform the first analysis being a static analysis of the incoming object without execution of the incoming object.

13. The system of claim 11, wherein the second electronic device is remotely located from the first electronic device.

14. The system of claim 11, wherein the process operation and the set of process parameters are pre-selected based on a location within the virtual machine in which the monitor is located.

15. The system of claim 11, wherein the process operation includes a function call.

16. The system of claim 11, wherein the set of process parameters defines one or more of a state of modules within the virtual machine.

17. The system of claim 11, wherein the process operation includes a process/thread lifecycle operation.

18. The system of claim 11, wherein a component in which the monitor is located corresponds to a virtual machine manager (VMM) running outside the virtual machine.

19. A computerized method for classifying an object based on detected process operations and associated process parameters that describe the context of the process operations, comprising:
processing the object within a virtual machine;
inspecting, by a monitor, operations of one or more processes running during processing of the object;
capturing a process operation of the operations and a set of process parameters corresponding to the process operation, the set of process parameters defines a context in which the process operation is performed within the virtual machine during the processing of the object;
determining whether the process operation is a behavior for use in determining whether the object is associated with malware, the behavior corresponds to an event including at least information associated with the process operation and the set of process parameters associated with the process operation;
generating a probability of the object being associated with malware based on an analysis of one or more events detected by the monitor including the event by at least comparing the one or more events including the event to a plurality of events each associated with a behavior of known malware or a behavior of a known benign object, and
responsive to the probability being equal to or above a first predefined level, classifying the object as malware.

20. The computerized method of claim 19, wherein the process operation and the set of process parameters are pre-selected based on a location within the virtual machine in which the monitor is located.

21. The computerized method of claim 19, wherein the process operation includes a function call.

22. The computerized method of claim 19, wherein a component in which the monitor is located is a process running within the virtual machine.

23. The computerized method of claim 19, wherein the analysis of the one or more events detected by the monitor is conducted in accordance with pre-defined rules developed through experiential knowledge or machine learning techniques regarding behaviors associated with known malware and behaviors associated with benign objects.

24. The computerized method of claim 19, wherein a component in which the monitor is located corresponds to a portion of an operating system running in the virtual machine.

25. The computerized method of claim 19, wherein a component in which the monitor is located corresponds to a virtual machine manager (VMM) running outside the virtual machine.

26. An electronic device comprising:
one or more hardware processors; and
a memory including one or more software modules including, when executed by the one or more hardware processors:
a first software module that, when executed by the one or more hardware processors, performs dynamic analysis on the object, wherein the dynamic analysis includes (i) processing the object within a virtual machine, (ii) detecting, by a monitor, a process operation during the processing of the object within the virtual machine, and (iii) determining a behavior including at least information associated with the process operation and a corresponding set of process parameters associated with the process operation, wherein the set of process parameters defines a context in which the process operation was performed within the virtual machine when the process operation is detected, a second software module that, when executed by the one or more hardware processors, generates a probability of the object being associated with malware based on an analysis of one or more events detected by the monitor by at least comparing the one or more events including the event to a plurality of events each associated with a behavior of known malware or a behavior of a known benign object, and a third software module that, when executed by the one or more hardware processors and in response to the probability being equal to or above a first predefined level, classifies the object as malware.

27. The electronic device of claim 26, wherein the process operation and the set of process parameters are pre-selected based on a location within the virtual machine in which the monitor is located.

28. The electronic device of claim 26, wherein the process operation includes a function call.

29. The electronic device of claim 26, wherein a component in which the monitor is located is a process running within the virtual machine.

30. The electronic device of claim 26, wherein the analysis of the one or more events detected by the monitor during the generating of the probability of the object is conducted in accordance with pre-defined rules developed through experiential knowledge or machine learning techniques regarding behaviors associated with known malware and behaviors associated with benign objects.

31. The electronic device of claim 26, wherein a component in which the monitor is located corresponds to a portion of an operating system running in the virtual machine.

32. The electronic device of claim 26, wherein a component in which the monitor is located corresponds to a virtual machine manager (VMM) running outside the virtual machine.

* * * * *